(12) United States Patent
Drory et al.

(10) Patent No.: US 9,058,105 B2
(45) Date of Patent: Jun. 16, 2015

(54) AUTOMATED ADJUSTMENT OF INPUT CONFIGURATION

(75) Inventors: Tal Simha Drory, Haifa (IL); Mattias Marder, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 907 days.

(21) Appl. No.: 12/916,544

(22) Filed: Oct. 31, 2010

(65) Prior Publication Data

US 2012/0110459 A1    May 3, 2012

(51) Int. Cl.
  *G06F 3/048*    (2013.01)
  *G06F 3/00*    (2006.01)
  *G06F 3/0489*    (2013.01)
  *G06F 3/023*    (2006.01)
  *G06F 17/00*    (2006.01)

(52) U.S. Cl.
  CPC ............ *G06F 3/0489* (2013.01); *G06F 3/0233* (2013.01)

(58) Field of Classification Search
  None
  See application file for complete search history.

(56) References Cited

U.S. PATENT DOCUMENTS

| | | | |
|---|---|---|---|
| 5,523,754 A | 6/1996 | Eisen et al. | |
| 7,392,326 B2 * | 6/2008 | Vale | 709/245 |
| 7,403,888 B1 * | 7/2008 | Wang et al. | 704/2 |
| 7,424,675 B2 * | 9/2008 | Lee et al. | 715/262 |
| 7,562,007 B2 * | 7/2009 | Hwang | 704/8 |
| 7,607,086 B2 | 10/2009 | Need et al. | |
| 8,326,333 B2 * | 12/2012 | Nyberg et al. | 455/466 |
| 8,364,134 B2 * | 1/2013 | Rang et al. | 455/418 |
| 8,463,592 B2 * | 6/2013 | Lu et al. | 704/2 |
| 2003/0125927 A1 * | 7/2003 | Seme | 704/3 |
| 2007/0061718 A1 * | 3/2007 | Nurmi | 715/542 |
| 2007/0073517 A1 * | 3/2007 | Panje | 702/181 |
| 2007/0085835 A1 * | 4/2007 | Plestid et al. | 345/171 |
| 2007/0089049 A1 * | 4/2007 | Gormish et al. | 715/507 |
| 2007/0168450 A1 * | 7/2007 | Prajapat et al. | 709/207 |
| 2008/0001959 A1 | 1/2008 | Geva et al. | |
| 2008/0070604 A1 * | 3/2008 | Castagnet | 455/466 |
| 2009/0241027 A1 * | 9/2009 | Gao | 715/704 |
| 2009/0309835 A1 | 12/2009 | Levin et al. | |
| 2010/0251163 A1 * | 9/2010 | Keable | 715/780 |
| 2012/0029902 A1 * | 2/2012 | Lu et al. | 704/2 |
| 2012/0226490 A1 * | 9/2012 | Mashiah | 704/8 |

* cited by examiner

*Primary Examiner* — Yongjia Pan

(57) ABSTRACT

A method and system for automatically adjusting input configuration are disclosed. The method may include monitoring information input by a user into a graphical user interface (GUI). The method may further include determining an input configuration state of the computing system set by the user for the information input into at least one field of the GUI at an initial input instance. The method may also include, at one or more subsequent input instances, automatically adjusting the input configuration state for the field to the determined input configuration of the initial input instance. A computer program product is also disclosed.

17 Claims, 4 Drawing Sheets

AUTOMATED ADJUSTMENT OF INPUT CONFIGURATION

BACKGROUND

The present invention relates to a method and system for automated adjustment of input configuration.

When working with computer systems and applications, sometimes the operator may be required to change the keyboard status. This occurs, for example, when entering a data field that requires a keyboard language other then the current language (e.g., when the user who is currently in English mode wishes to enter data in Hebrew), when changing the status of Caps Lock or Num Lock, and when changing the keyboard layout.

In various situations such changes are done in a similar manner and sometimes even repeatedly. For example, a Hebrew speaking user would change the keyboard language setting to Hebrew when entering text in the email text field, and would then change the keyboard language setting to English when entering an email address in the email address field. Although such changes are relatively easy to infer and anticipate they are not done automatically most of the times.

A known exception is handling password fields. Browsers and add-ons exist that recognize password fields, store the password for future uses, and even suggest entering the password for the user. However, this solution is application specific and targeted to passwords only.

SUMMARY

According to an embodiment of the present invention there is provided a method for automatically adjusting input configuration of a computing system. The method may include monitoring information input by a user into a graphical user interface (GUI). The method may further include determining an input configuration state of the computing system set by the user for the information input into at least one field of the GUI at an initial input instance. The method may also include, at one or more subsequent input instances, automatically adjusting the input configuration state for said at least one field to the determined input configuration of the initial input instance.

Furthermore, in accordance with embodiments of the present invention, there is provided a computer program product stored on a non-transitory tangible computer-readable storage medium. The computer program may include code for monitoring information input by a user into a graphical user interface (GUI). The computer program may include code for determining an input configuration state of the computing system set by the user for the information input into at least one field of the GUI at an initial input instance. The computer program may also include code for, at one or more subsequent input instances, automatically adjusting the input configuration state for said at least one field to the determined input configuration of the initial input instance.

Furthermore, in accordance with embodiments of the present invention, there is provided a system for automatically adjusting input configuration. The system may include a processor configured to monitor information input by a user into a graphical user interface (GUI). The processor may also be configured to determine an input configuration state of the computing system set by the user for the information input into at least one field of the GUI at an initial input instance. The processor may also be configured to, at one or more subsequent input instances, automatically adjust the input configuration state for said at least one field to the determined input configuration of the initial input instance.

Furthermore, in accordance with embodiments of the present invention, there is provided a method for automatically adjusting input configuration of a computing system. The method may include monitoring information input by a user into a graphical user interface (GUI) by performing screen scraping. The method may also include determining an input configuration state of the computing system set by the user for the information input into at least one field of the GUI at an initial input instance by tracking operating system operations indicative of the input configuration state. The method may further include, at one or more subsequent input instances, automatically adjusting the input configuration state for said at least one field to the determined input configuration of the initial input instance.

BRIEF DESCRIPTION OF THE SEVERAL VIEWS OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

Figure 1:
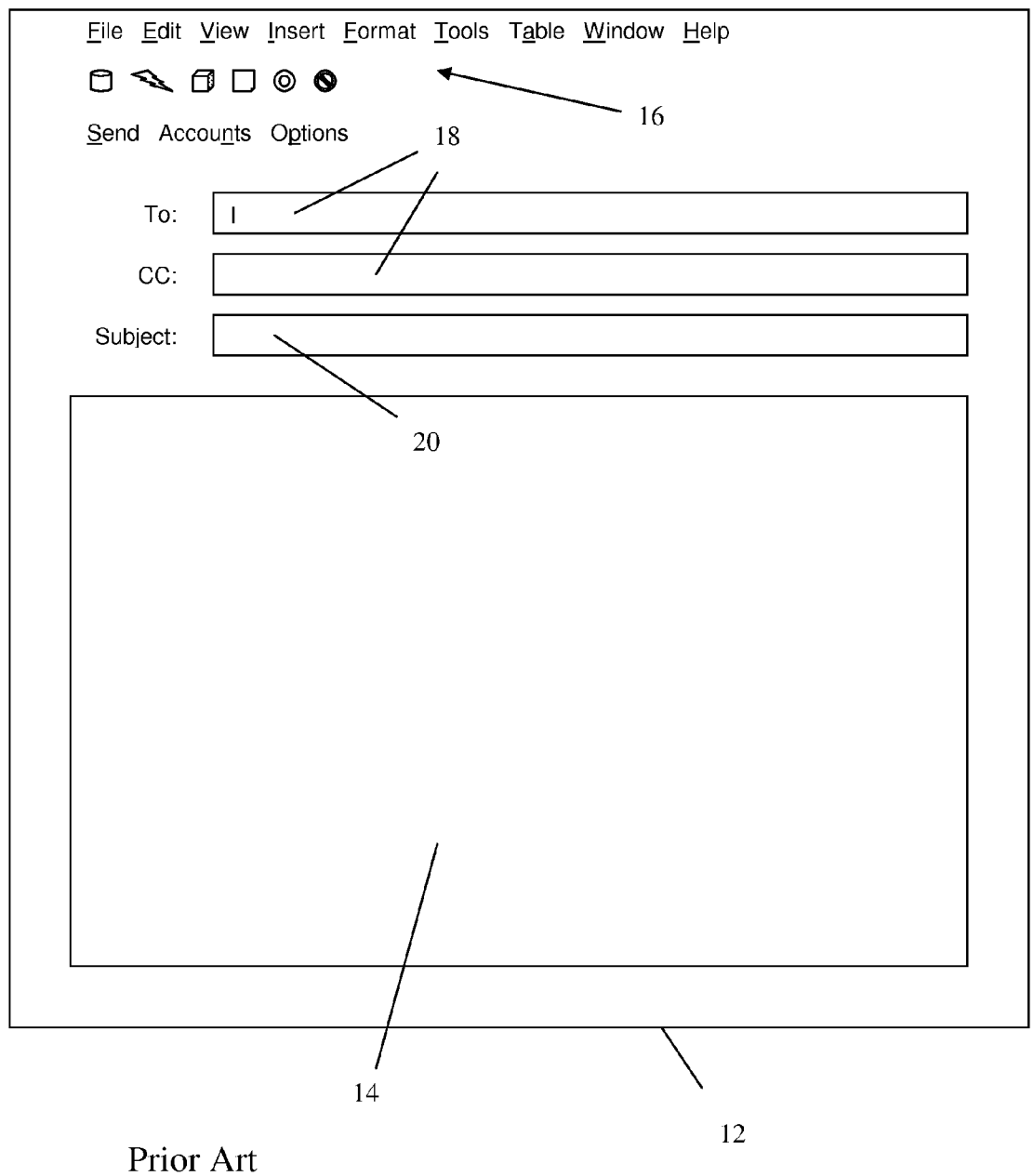
FIG. 1 illustrates a graphical user interface (GUI) 12 of an email application (prior art).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to an embodiment of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Flowchart/s and block diagram/s in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In accordance with an embodiment of the present invention, a method and system for automatic adjustment of input configuration of a computing system for each specific data field in a monitored graphical user interface of a computer application are disclosed herein.

In the context of the present invention, the term "input interface" is understood to cover all kinds of input interfaces (e.g. keyboard, pointing device, touch screen) which may be used by a user for inputting information if required or desired to do so when prompted by an application running on a computing device, and displaying an input graphical user interface on a display (e.g. monitor screen).

A method and system for automatic adjustment of input interface configuration, in accordance with an embodiment of the present invention, may be based on learning the input behavior of a user and offering that user an automated adjustment of input interface configuration for that fits that user's input behavior.

In accordance with an embodiment of the present invention, a method and system for automatically setting keyboard input configuration may be designed to learn the input behavior of each user of a group of users, and offer each user an automated keyboard input configuration that fits that user's input behavior.

In accordance with an embodiment of the present invention, a method and system for automatically setting keyboard input configuration may shorten entry time of data forms and may reduce human errors.

There exist various kinds of input fields that require different input configuration. For example email address fields (typically Latin keyboard configuration required), name fields (typically local language configuration), number fields (numerical configuration).

In accordance with an embodiment of the present invention, screen scraping technology may be used, which involves employing OCR (optical character recognition) on the screen image to recognize the content of the screen displayed to the user while the computer is running the application which requires input from the user. Screen scraping technology may also include parsing of the structured data of a running application to which the GUI pertains, either retrieved directly from the application itself (via an API), or via the operating system (OS).

A method in accordance with an embodiment of the present invention, may include the following steps:

a) Monitoring the application screen while the user is working, recognizing the content of the screen through screen scraping (OCR) and detecting input interface (e.g. keyboard, mouse) events or other operations performed by operating system.

b) Identifying the field the user is currently editing (based on data from (a)).

c) Learning the user actions and system configuration as dependant on the screens and fields the user is editing, and d) After accumulating enough knowledge on the specific user behavior, at least one rule for each monitored input field is generated.

e) The next time the user enters information into the fields of the monitored graphical user interface that is displayed on the screen, if rules have previously been generated, the proposed method applies the input interface configuration automatically according to the generated rules.

The input interface configuration changes may be applied, whenever there is a cue that the user is typing, or is about to type, in a specific field.

In an alternative embodiment of the present invention, the input interface configuration changes may be applied in an automated post processing procedure. In a post processing routine, a field, (or a plurality of fields), of a window may be automatically adjusted according to the learned input pattern of the user (as opposed to automatic system configuration concurrent with the time of data entry). The automated post-processing procedure may be user initiated (e.g. by the user pressing a designated key or icon) or operated during the input of information by the user or just after the user has completed inputting the information in that field.

For example, consider the email example above. According to an embodiment of the present invention, a designated application monitors the screen image (by performing screen scraping) and correlates it to the user's input actions When the user points at the email address field (characterized in most email applications by the title "To:", which in many cases is found to the left of the field and identified as such in the screen scraping phase) he or she would input the email address only if the language mode of the input interface—the keyboard in this case—is English (or any other language which uses an alphabet which is suitable for entering email addresses), and if the language mode is not English, the user would change the language configuration to English. These actions are recorded by the designated application so that after accumulating enough information on this field, the next time the user activates the email application and starts writing an email message, when reaching the email address field the designated application verifies that the language mode of the keyboard is English, and if it is not—the language mode is switched by the system to English. The designated application may perform keyboard language changes, for example, by generating a keyboard event corresponding to a language mode change, or by using an application programming interface (API).

A method for automatic adjustment of input interface configuration according to an embodiment of the present invention may be based on visual analysis of the screen, and thus, it may be applied to any program which displays an input interface on a screen for the user to use in inputting information into fields on the input interface, independently and without accessing the source code of the monitored application, and/or the platform on which it is executed.

FIG. 1 illustrates a graphical user interface (GUI) 12 of an email application (prior art), which includes menu keys 16 (some of the menu keys are textual and some menu keys are graphical icons). GUI 12 also includes email address fields 18 ("To:" and "CC:"), which are designed for entering the email address of the addressees, and two textual fields—"Subject" field 20 and message body field 14, which are designed for entering text.

When a user wishes to send an email message in a language other than English (or other language whose alphabet may be used for entering email address in proper format) he or she may perform the following actions:

a) select an email address field, e.g., by placing the cursor into the email address field, and enter an email address of the addressee. If the current language configuration of the keyboard is English the user would type an email address. If, however, the current language configuration of the keyboard is not English, e.g. Hebrew, Arabic, Chinese, Russian or other language that is not suitable for an email address, the user would first switch the current language configuration of the keyboard to English. Perhaps at first erroneous typing is done with the wrong language setting, and upon realizing the mistake, the user would delete the typed text and switch the language configuration of the keyboard to English before retyping.

b) select a text field, e.g. by placing the cursor into the text field, and type a message in the desired language. If the desired language is a language that uses an alphabet different from the current setting, the user would switch the language configuration of the keyboard to that language.

The order of information entry (e.g., first entering email address and then typing the message text or vice versa) may be arbitrary.

In accordance with embodiments of the present invention a screen image of a GUI of an application may be monitored. A screen scraping tool may be used to detect visible text and graphical items or symbols (e.g., icons) appearing on the screen. The detected content of the text or graphical component and its position are recorded. An input interface (e.g., keyboard and/or mouse) listener tool may be used working in parallel to the screen scraping tool for recording the order of keyboard entries and mouse click events.

The active field in which information is currently entered may be identified. There are known methods for detecting the position of the editing marker (e.g. cursor). For example, the sign to look for may be a flashing marker or a highlighted field on the screen, both of which would be detected by known change detection techniques. After each keyboard stroke the screen may be analyzed and the appearance of a new character on the screen may indicate the location of a currently edited field.

If there is a mouse click event, the coordinates of that event and the surroundings of that event may be analyzed for determining the existence of an editable field, or may be compared to a previously completed analysis of the area surrounding the mouse event.

The user actions when editing fields on the screen and concurrent input interface configuration may be associated with the monitored screen.

The history of the input interface configurations for each field in a first input instance or a few first instances (hereinafter referred to as an "initial input instance") may be recorded and stored.

Thus, for the next input instance and subsequent input instances, when the user selects one of the fields, the input interface configuration may be set to match the configuration used by the user in the first input instance.

According to embodiments of the present invention initial input instance for a particular field (or for some or all fields on the screen) may include a number of input instances, so that automatic adjustment of input interface configuration may be performed only after a number of initial input instances have been recorded, and statistics collected for that data field may allow determination of the user preferred input interface configuration for that field. In some embodiments of the present invention the number of input instances may be user customizable.

In a case where there is no indication before the user enters data into a field, and the input interface configuration may be determined only after the user has started entering the data, post-processing may be performed, where the already written text is reformatted according to the learned behavior of the user. For example, if the direction of a certain data field is always left to right, that could be automatically corrected after the data entry, as would be the case of entering a telephone number or the like.

By employing a method or using a system in accordance with embodiments of the present invention, the user may be provided with the correct keyboard settings before entering text. According to other embodiments of the present invention post processing may be employed to verify that data was input in the correct input interface configuration, and if not, it may be corrected. The user may thus save time by eliminating the need to configure the input interface manually as well as avoiding typing errors caused by incorrect keyboard configuration.

Figure 2:
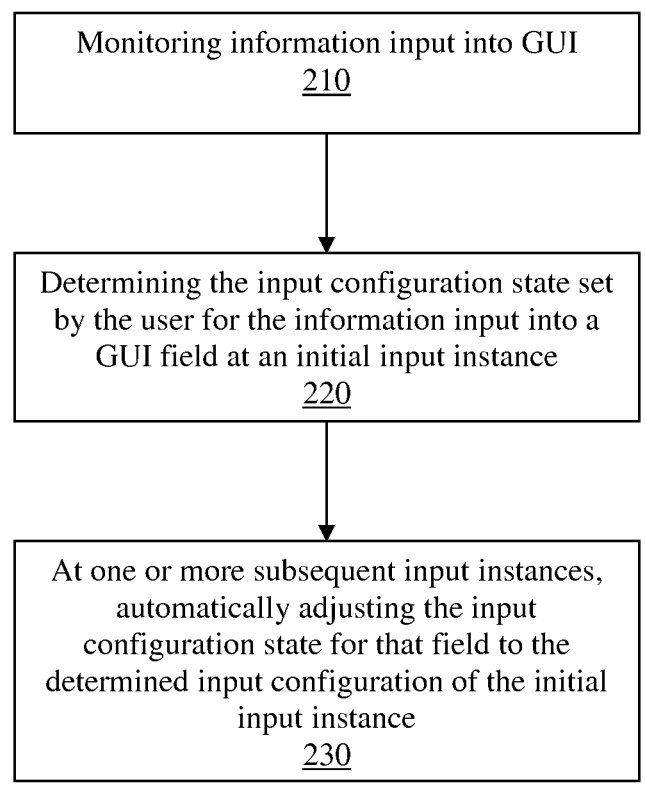
FIG. 2 illustrates a method for automatically adjusting input configuration of a computing system, in accordance with an embodiment of the present invention.

A method for automatically adjusting input interface configuration, in accordance with an embodiment of the present invention, is illustrated in FIG. 2.

The method may include monitoring 210 information input into a GUI. The method may further include determining 220 an input configuration state set by a user for the information input into at least one field of the GUI at an initial input instance. The method also may include, at one or more subsequent input instances, automatically adjusting 230 the input configuration state for said at least one field to the determined input configuration of the initial input instance.

Figure 3:
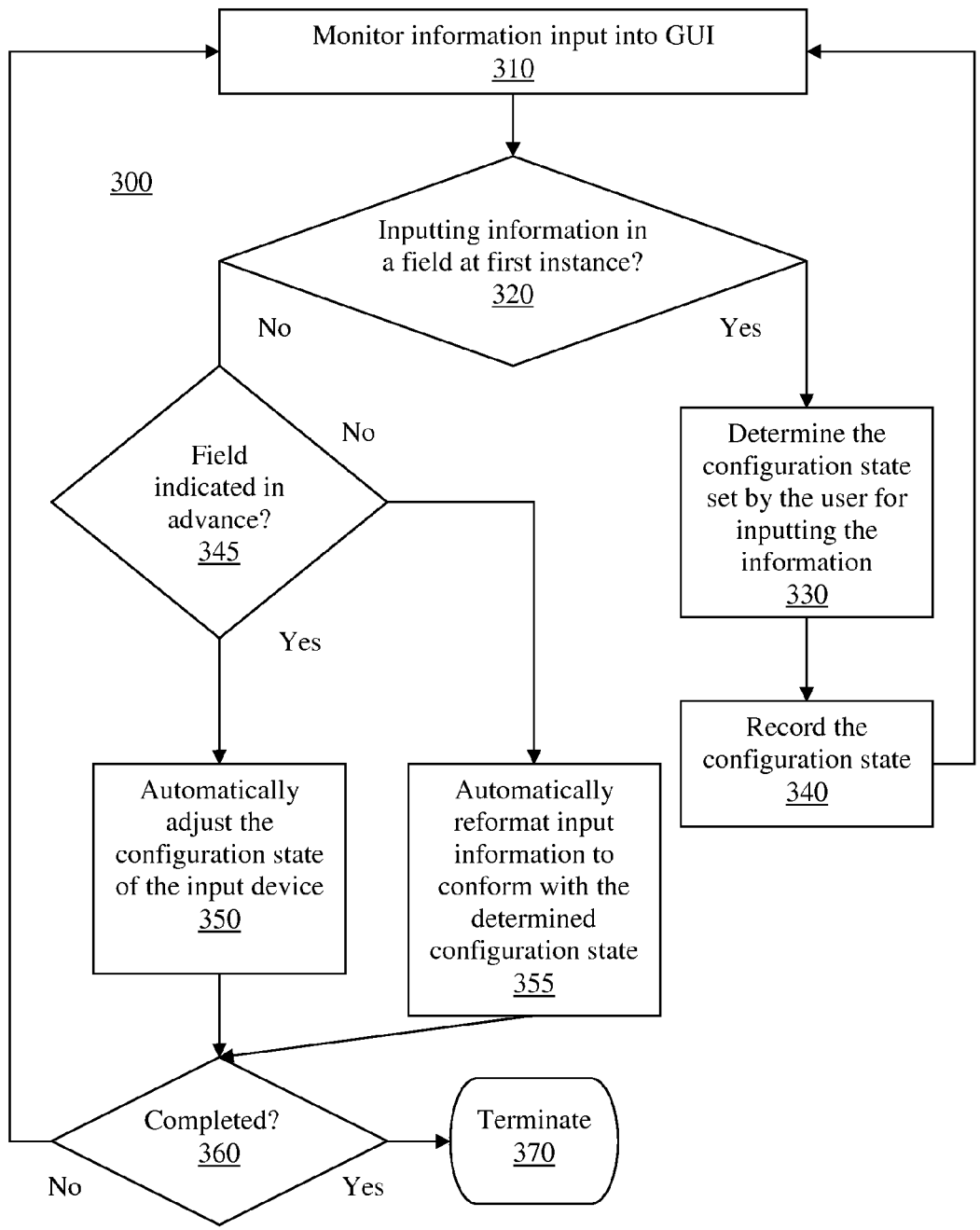
FIG. 3 illustrates a process for automatically adjusting input configuration of a computing system, in accordance with an embodiment of the present invention.

Process 300 for automatically adjusting input interface configuration in accordance with an embodiment of the present invention, is illustrated in FIG. 3.

The process (e.g. an algorithm) may include monitoring an information input GUI 310. When a user inputs information in a field of the GUI it may be determined 320 whether it is done for the first input instance (or at an initial instance as defined hereinabove).

If the user inputs information in that field at the first input instance the configuration state of the input interface may be determined 330 and recorded 340 and the GUI may be further monitored 310.

If it is not the first input instance (as defined hereinabove) that the user is inputting information in this field, then it may be determined whether there is an advance indication 345 of the input field which is currently selected by the user for inputting information before the user starts inputting information (e.g. the user presses TAB and advances the cursor into a field, or clicks the pointing device on the field). If such advance indication is detected the configuration state of the input interface may be adjusted 350 to the determined configuration for that field. It may then be determined 360 whether the input GUI is completed. If it is indeed completed the process may terminate 370. If the input GUI is not completed it may be further monitored 310.

If there is no advance indication of the selected field, before the user starts inputting information into it, than the input information may be automatically reformatted 355 to conform with the determined input interface configuration for that field.

Figure 4:
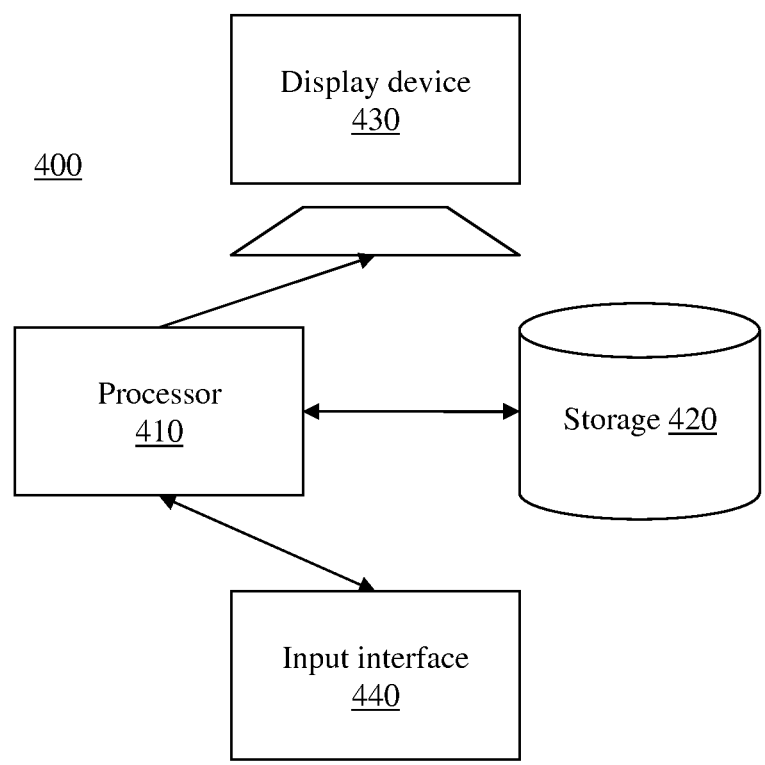
FIG. 4 illustrates a system for automatically adjusting input configuration of a computing system, in accordance with an embodiment of the present invention.

FIG. 4 illustrates a system 400 for automatically adjusting input interface configuration, in accordance with an embodiment of the present invention. Such system may include a storage medium 420, such as for example a hard disk drive. The system may also include processor 410, an input interface 440, such as, for example, a keyboard, or a touch screen, and a display device 430, such as, for example, a monitor.

The storage medium 420 may be used to store a computer program product (e.g. computer software application) which may be executed on processor 410, that may include code for performing a method for automatically adjusting input interface configuration, in accordance with an embodiment of the present invention.

What is claimed is:

1. A method for automatically adjusting input configuration of a computing system, the method comprising:
   monitoring information input by a user into a graphical user interface (GUI);
   determining a keyboard input configuration state of the computing system set by the user for the information input into at least one field of the GUI at an initial input instance, wherein the input configuration state comprises a layout of the characters across the GUI; and
   at one or more subsequent input instances, automatically changing the keyboard input configuration state for said at least one field to the determined keyboard input configuration of the initial input instance, by:
   (a) detecting text being entered in a field of said at least one fields; and
   (b) reformatting the text that was entered by the user in that field to conform with the determined keyboard input configuration of the initial input instance.

2. The method of claim 1, wherein the step of determining the input configuration state of the computing system includes tracking operating system operations indicative of the input configuration state.

3. The method of claim 1, wherein the monitoring of the GUI includes performing screen scraping on the GUI.

4. The method of claim 1, wherein the step of automatically adjusting the input configuration state for said at least one field to the determined input configuration of the initial input instance includes performing an action selected from the group of actions consisting of generating a keyboard event, and using an application programming interface.

5. The method of claim 1, wherein the step of automatically adjusting the input configuration state for that field is initiated by the user.

6. A computer program product stored on a non-transitory tangible computer-readable storage medium, the computer program including code for:
   monitoring information input by a user into a graphical user interface (GUI);
   determining a keyboard input configuration state of the computing system set by the user for the information input into at least one field of the GUI at an initial input instance, wherein the input configuration state comprises a layout of the characters across the GUI; and
   at one or more subsequent input instances, automatically changing the keyboard input configuration state for said at least one field to the determined keyboard input configuration of the initial input instance, by:
   (a) detecting text being entered in a field of said at least one fields; and
   (b) reformatting the text that was entered by the user in that field to conform with the determined keyboard input configuration of the initial input instance.

7. The computer program product of claim 6, wherein the code for determining the input configuration state of the computing system includes code for tracking operating system operations indicative of the input configuration state.

8. The computer program product of claim 6, wherein the code for monitoring of the GUI includes code for performing screen scraping on the GUI.

9. The computer program product of claim 6, wherein the code for automatically adjusting the input configuration state for said at least one field to the determined input configuration of the initial input instance includes code for performing an action selected from the group of actions consisting of generating a keyboard event, and using an application programming interface.

10. The computer program product of claim 6, wherein the code for automatically adjusting the input configuration state for that field include code for user initiation of the automatic adjustment of the input configuration state.

11. A system for automatically adjusting input configuration, the system comprising:
   a processor configured to:
   monitor information input by a user into a graphical user interface (GUI);
   determine a keyboard input configuration state of the computing system set by the user for the information input into at least one field of the GUI at an initial input instance, wherein the input configuration state comprises a layout of the characters across the GUI; and
   at one or more subsequent input instances, automatically change the keyboard input configuration state for said at least one field to the determined keyboard input configuration of the initial input instance, by:
   (a) detecting text being entered in a field of said at least one fields; and
   (b) reformatting the text that was entered by the user in that field to conform with the determined keyboard input configuration of the initial input instance.

12. The system of claim 11, wherein the processor is configured, when monitoring the information input, to track operating system operations indicative of information input by the user.

13. The system of claim 11, wherein the processor is configured, when monitoring of the GUI, to perform screen scraping on the GUI.

14. The system of claim 11, wherein the processor is configured, when automatically adjusting the input configuration state for said at least one field to the determined input configuration of the initial input instance, to perform an action selected from the group of actions consisting of generating a keyboard event, and using an application programming interface.

15. The system of claim 11, wherein the processor is configured to respond to a user initiation by automatically adjusting the input configuration state for that field.

16. A method for automatically adjusting input configuration of a computing system, the method comprising:
   monitoring information input by a user into a graphical user interface (GUI) by performing screen scraping;
   determining a keyboard input configuration state of the computing system set by the user for the information input into at least one field of the GUI at an initial input instance by tracking operating system operations indicative of the input configuration state, wherein the input configuration state comprises a layout of the characters across the GUI; and
   at one or more subsequent input instances, automatically changing the keyboard input configuration state for said at least one field to the determined keyboard input configuration of the initial input instance, by:
   (a) detecting text being entered in a field of said at least one fields; and
   (b) reformatting the text that was entered by the user in that field to conform with the determined keyboard input configuration of the initial input instance.

17. The method of claim 16, wherein the step of automatically adjusting the input configuration state for that field is initiated by the user.

\* \* \* \* \*

UNITED STATES PATENT AND TRADEMARK OFFICE
CERTIFICATE OF CORRECTION

PATENT NO. : 9,058,105 B2
APPLICATION NO. : 12/916544
DATED : June 16, 2015
INVENTOR(S) : Drory et al.

Page 1 of 1

It is certified that error appears in the above-identified patent and that said Letters Patent is hereby corrected as shown below:

On The Title Page, Item (75) Inventors should read

-- Tai Drory, Haifa (IL);
Mattias Marder, Haifa (IL) --

Signed and Sealed this
Fifteenth Day of March, 2016

Michelle K. Lee
*Director of the United States Patent and Trademark Office*

UNITED STATES PATENT AND TRADEMARK OFFICE
CERTIFICATE OF CORRECTION

Page 1 of 1

PATENT NO.         : 9,058,105 B2
APPLICATION NO.    : 12/916544
DATED              : June 16, 2015
INVENTOR(S)        : Tal Drory et al.

It is certified that error appears in the above-identified patent and that said Letters Patent is hereby corrected as shown below:

On the title page, item (75) Inventors should read:

--Tal Drory, Haifa (IL);
Mattias Marder, Haifa (IL)--

This certificate supersedes the Certificate of Correction issued March 15, 2016.

Signed and Sealed this
Seventeenth Day of May, 2016

Michelle K. Lee
*Director of the United States Patent and Trademark Office*